(12) United States Patent
Kren

(10) Patent No.: US 10,855,902 B2
(45) Date of Patent: Dec. 1, 2020

(54) SYSTEM, METHOD AND APPARATUS FOR NETWORKING-INDEPENDENT SYNCHRONIZED GENERATION OF A SERIES OF IMAGES

(71) Applicant: Volker Kren, Esslingen am Neckar (DE)

(72) Inventor: Volker Kren, Esslingen am Neckar (DE)

( * ) Notice: Subject to any disclaimer, the term of this patent is extended or adjusted under 35 U.S.C. 154(b) by 20 days.

(21) Appl. No.: 16/221,207

(22) Filed: Dec. 14, 2018

(65) Prior Publication Data

US 2019/0191099 A1    Jun. 20, 2019

(30) Foreign Application Priority Data

Dec. 15, 2017   (DE) .................. 10 2017 011 656

(51) Int. Cl.
*H04N 5/232*   (2006.01)
*H04N 1/00*   (2006.01)
(Continued)

(52) U.S. Cl.
CPC ... *H04N 5/232061* (2018.08); *H04N 1/00148* (2013.01); *H04N 1/00251* (2013.01);
(Continued)

(58) Field of Classification Search
CPC ......... H04N 5/232061; H04N 5/23222; H04N 1/00251
See application file for complete search history.

(56) References Cited

U.S. PATENT DOCUMENTS

| 2006/0187230 A1* | 8/2006 | Jung | H04N 5/23206 |
| | | | 345/581 |
| 2008/0036871 A1* | 2/2008 | Ohmura | H04N 1/00127 |
| | | | 348/222.1 |

(Continued)

*Primary Examiner* — Christopher K Peterson
(74) *Attorney, Agent, or Firm* — Raymond Van Dyke; Van Dyke Intellectual Prop Law

(57) ABSTRACT

System, Method and Apparatus for generating a collection of images, the technique including providing at least two mobile devices with a data processing unit, a storage memory and a camera integrated therein or connected thereto; providing a master system with a data processing unit and a storage memory or configuring of one of the mobile devices as master system and configuring of the other or of all mobile devices as slave systems; setting a recording criterion in the master system; transmitting the recording criterion to the slave systems; setting a series ending criterion in the master system; transmitting the series ending criterion to the slave systems; respectively performing a process for recording an image on each slave system as long as the series ending criterion is not fulfilled comprising the steps of recording at least one image with the camera of one of the slave systems whenever the recording criterion is fulfilled, and sending the image from the slave system to the master system together with a time stamp, a series number and/or another variable for grouping the image; saving each of the images sent respectively with their time stamp, their series number and/or their variable for grouping in the storage memory of the master system; and generating a series of images comprising the images sent in order according to their time stamp, their series number and/or their variable for grouping.

30 Claims, 2 Drawing Sheets

(51) Int. Cl.

| | |
|---|---|
| *H04N 5/247* | (2006.01) |
| *H04N 1/21* | (2006.01) |
| *H04N 1/32* | (2006.01) |
| *H04N 5/77* | (2006.01) |
| *H04W 4/021* | (2018.01) |
| *H04W 4/02* | (2018.01) |
| *H04W 84/20* | (2009.01) |

(52) U.S. Cl.
CPC ........... *H04N 1/00933* (2013.01); *H04N 1/21* (2013.01); *H04N 1/2187* (2013.01); *H04N 1/32106* (2013.01); *H04N 5/23222* (2013.01); *H04N 5/247* (2013.01); *H04N 5/77* (2013.01); *H04W 4/021* (2013.01); *H04W 4/023* (2013.01); *H04N 2201/0084* (2013.01); *H04N 2201/3215* (2013.01); *H04W 84/20* (2013.01)

(56) References Cited

U.S. PATENT DOCUMENTS

| | | |
|---|---|---|
| 2010/0009700 A1 | 1/2010 | Camp, Jr. |
| 2011/0157389 A1 | 6/2011 | McClellan |
| 2014/0362246 A1 | 12/2014 | Nakano |
| 2017/0324888 A1 | 11/2017 | Boone |

\* cited by examiner

SYSTEM, METHOD AND APPARATUS FOR NETWORKING-INDEPENDENT SYNCHRONIZED GENERATION OF A SERIES OF IMAGES

BACKGROUND OF THE INVENTION

The present invention concerns a method for generating a series of images or a collection of images comprising: providing of at least two mobile devices with a data processing unit, a storage memory and a camera integrated therein or connected thereto; providing a master system with a data processing unit and a storage memory or configuring of one of the mobile devices as master system and configuring of the other or all mobile devices as slave systems; setting a recording criterion in the master system; and transmitting the recording criterion to the slave systems.

Similar methods are generally known from various applications, in which several recording devices take images in a coordinated way. Usually, the aim is to combine/connect the images of several different recording devices to obtain a connected image, 3-D data or other information about a certain interesting subject.

For example US 2013/0128052 A1 shows a method for creating recordings with several perspectives (e.g. for creating 3D-images), wherein several cameras have to be synchronized and afterwards synchronized instructions to begin a recording have to be sent to the cameras.

A general method for synchronizing several devices with cameras is known from US 2010/0289951 A1.

From US 2006/0001744 A1 a method for creating a network with several mobile devices with cameras is known, wherein the mobile devices receive synchronous instructions for image recording for example to generate a 360° panorama image without gaps.

From US 2010/0009700 A1 a method is known, wherein several mobile devices with cameras receive signals from a central image processing system for generating a recording, either directly caused by the signal or as a request to the users. These signals take place when the information sent regularly from the mobile devices to the image processing system indicates that the mobile device is located relatively to an object of interest in a suitable recording position. The collected images are used for generating a series of images about objects of interest and/or are used for measuring them. The method of US 2010/0009700 A1 also comprises the features of the preamble of claim 1.

And yet the known methods have serious weaknesses in case a series of images is to be created jointly with a group of mobile devices with cameras, which series of images is not only to show a single object from different perspectives but should be a chronological collection of similar or different objects/places which are photographed with different cameras of the group, wherein gaps in the series of images should preferably be avoided.

But the need for this exists for example in case a group of hikers that individually or with individual speed walk along for example a certain route and a series of images comprising images from each remarkable way-point is to be created by everybody in the group.

Another example would be a group of cameras carried by persons, with which a series of images for documentation of the movement of all involved persons is to be generated.

Another example would be the case when for a longer period of time a series of images about an object of interest from different vantage points or from different positions should be produced for example to track changes.

Another example would be keeping a common synchronized photo diary when different users over a longer period of time/over days or weeks for example want to take images at the same point in time and want to connect them in a photo diary.

With these and similar problems there is on the one hand not necessarily continuous networking possible and on the other hand it must preferably be ensured that all desired recordings to take place do take place and are appropriately connected to a series of images.

DETAILED DESCRIPTION OF THE PRESENT INVENTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

In light of this background the task of the present invention is to specify a method with which such series of images are possible while overcoming the disadvantages of the prior art.

This task is resolved by a method according to claim 1. Preferable embodiments are the matter of the dependent claims.

The inventive method provides the following steps:

a) providing at least two mobile devices with a data processing unit, a storage memory and a camera integrated therein or connected thereto;

b) providing a master system with a data processing unit and a storage memory or configuring of one of the mobile devices as master system and configuring of the other or of all mobile devices as slave systems;

c1) setting a recording criterion in the master system;

d1) transmitting the recording criterion to the slave systems;

c2) setting a series ending criterion in the master system;

d2) transmitting the series ending criterion to the slave systems;

e) respectively performing a process for recording an image on each slave system as long as the series ending criterion is not fulfilled comprising the steps:

e1) recording at least one image with the camera of a slave system whenever the recording criterion is fulfilled; and e2) sending the image from the slave system to the master system together with a time stamp, a series number and/or another variable for grouping the image;

f) saving each of the images sent respectively in step e2) with their time stamp, their series number and/or their variable for grouping in the storage memory of the master system; and g) generating a series of images comprising the images sent in order according to their time stamp, their series number and/or their variable for grouping.

The sequence usually corresponds to the alphabetical order of the above listed steps. But especially step c2) can also occur after the step d1) or c1) after d2); it is only necessary that at the beginning of the image recording process of each slave system the recording criterion or criteria has or have all been transmitted and that timely before the expected chronological end of the series also the criterion for ending the series is transmitted. Preferably setting and transmitting happen one after another or simultaneously.

Furthermore, step e2) preferably occurs always directly after step e1); but step e2) can also occur later, for example when the respective slave system has no contact to the master system. Or step e2) can also occur several times e.g. until the confirmation signal of the master system to the slave system about the receipt of the respective image has been received by the slave system.

The inventive method ensures even in case of a breakdown of the communication between the master system and the slave system that each mobile device continues with the recording and that the respective series of images can be created.

Recording at least one image can mean the recording of a single image, but can also mean the recording of several images one right after another and especially also the recording of a video, so a lot of images per second over a certain period of time. Therein all images recorded within the scope of a single step e1) or a respective video can receive the same time stamp, series number and/or variable for grouping, usually according to the first of the just recorded images. Alternatively each image can receive respectively its own time stamp, its own series number and/or its own variable for grouping.

In principle recording of at least one image can also additionally include audio recording or recording of other data.

As recording criterion both a single criterion is a possibility as well as several criteria and also groups of subconditions.

An example for a single recording criterion would be that e.g. every mobile device is to do a recording every 10 seconds. Another would be that after reaching a certain position continuous recordings are to be done.

An example for several criteria would be that each of the mobile devices should when reaching a first position perform a recording every 30 seconds until leaving the position and that when reaching a second position perform a recording every 120 seconds until the distance to the second position exceeds a certain value.

An example for groups of subconditions would be:
Group I:
time>t1 or mobile device at position x1; or
time>t2 or mobile device at position x2.

Then at reaching X1 or time t1 an image will be recorded and accordingly at reaching x2 or time t2 another image.

In principle any combination of criteria with "and", "and/or" or "or" links are possible and as criteria fundamentally all characteristics are possible, which are/can be checkable from/by the mobile device, like position, time, elapsed time, distance to other devices or points, bodily characteristics of the user like pulse, receiving certain signals, certain reciprocal communication, certain activities/messages/signals in networks like for example the Internet, confirmation or command signals of the master system, air pressure, temperature, humidity, speed of the slave system for example determined from its GPS coordinates, certain commands or input by the user, etc.

The actual usable criteria depend of course also on the technical equipment of the mobile devices.

Thereby, preferably replacement criteria are provided for criteria, which depend on the communication with other devices. These are used, when there is no communication connection between the mobile device and the other devices, which are necessary for the actual criteria. It can especially be provided that in case of a breakdown of the position determination via GPS a time criterion is used instead of the actual position criterion or that as criterion the position is estimated via available data of the mobile device and to that effect the fulfillment of the position criterion is determined.

Here time and position are not only to be understood as a single point in time or a single place, but can also be time windows or areas, for example a certain time plus/minus 1 minute or an area consisting of two circles of 100 m around two separate points.

Preferably time stamps are used as criterion for sorting the images in the series of images so as variable for grouping. However in principle every criterion for sorting or every variable for grouping is possible, which is determinable/selectable by or at the slave system. Because with that it is ensured that the images recorded by the slave system can later be sorted into a sorted series of images independent of the contact to the master system according to the desired criterion for sorting or the variable for grouping.

Another simple variable for grouping can be the series number of an image within images recorded by the slave system according to step e), so in other words the number the image has in such an image recording process.

In principle everything can serve as a variable for grouping which can be determined by the slave system and which is usable for sorting. Accordingly, also all characteristics which have been described previously as possible recording criteria are possible as variables for grouping to be transmitted.

Therein recording criterion and variable for grouping can be of the same type—for example that the shortfall of the distance to a position coordinate serves as recording criterion and that exactly this distance to this position coordinate serves as variable for grouping—and also of different types—for example that again the recording criterion corresponds to a position and that speed serves as variable for grouping.

Furthermore, more than one variable for grouping can also be used. The sorting in the series of images can then be done according to a selected variable for grouping or also according to a weighted combination and also first according to one variable for grouping and in case of identity of this variable for grouping with two images according to another variable for grouping.

For example that the sorting is done according to a time stamp and in case of identical time the image with the lower series number in the series of images is sorted into before the other image.

In a preferred variant the method can be realized with mobile devices, which comprise means for determining a position coordinate, wherein the recording criterion or a single subcondition thereof is the entry or positioning of one of the mobile devices in a selected or a predefined area around a position coordinate.

In a preferred variant of the method the recording criterion or a single subcondition thereof can be the lapse of a time span or a point in time or a time window.

In a preferred variant of the method the recording criterion or a single subcondition thereof can be a relative position of a slave system to another slave system and/or to the master system.

In a preferred variant of the method the recording criterion or a single subcondition thereof can be a specific signal of the master system or of one of the slave systems.

In a preferable variant the method is realized with mobile devices, whose cameras are continuously or in certain phases in a recording condition and collect optical data, wherein the slave system and/or the master system comprises a image recognition software for analyzing this optical data, wherein the recording criterion or a single subcondition thereof is the identification of a certain pattern or a certain structure by the image recognition software.

Alternatively or additionally in this variant also pattern comparison, structure comparison and/or image comparison with predetermined patterns, structures or images can be the recording criterion or a subcriterion thereof.

Such predetermined patterns, structures or images can especially also be predetermined or selected by the master system using the setting of the recording criterion. The master system can receive corresponding input together with the data necessary for configuration as master system or corresponding input can be provided from the storage memory of the master system or from databases or servers.

Identification or comparison can therein also occur gradually, so that by a certain extent of congruence the criterion or subcondition thereof is fulfilled.

For example by determining which percentage of the pattern is identified and in case of exceeding a certain value like 50%, 75% or 90% the recording criterion or subcondition thereof is treated as fulfilled.

In a similar way also an image comparison can be done. Such comparisons can especially take place pixel by pixel, both referring to the entire image and also referring to partial areas, wherein a percentage of congruent pixels is determined and in case of exceeding or falling short of a limit thereof the criteria is treated as fulfilled.

In one realization of this variant before the beginning of step e) provided images are used and/or for later recordings of step e) also in accordingly determined way prior recordings of step e).

Especially the recording criterion or a subcondition thereof can also be a sufficient change or congruence of the currently recorded optical data with a prior and especially the last recorded image. This can also take place in the way of a pixel by pixel comparison.

In a preferred variant of the method the recording criterion or a single subcondition thereof can be a command, input and/or trigger of the user at the master system and/or at one of the slave systems.

In a preferred variant the method can be carried out with the master system or with mobile devices, which is/are connected with the network or which is/are connected otherwise via electronic distance communication, preferably with the Internet, and the recording criterion or a single subcondition thereof is a receipt of certain electronic signals.

In a preferred variant of the method the slave system can be configured to have a manual recording function, whose activation during the image recording process causes the recording of an image by the camera of the slave system and the sending of said image from the slave system to the master system together with a time stamp of the image.

In a preferred variant of the method the master system can be configured to react with a receipt confirmation after receiving of an image in step e2).

In a preferred variant of the method the slave system can be configured to save the image with the time stamp in case of interruption of a connection of the slave system with the master system and/or in case of failure of a sending according to step e2) and send it again at a later point in time in case of restoration of the connection and/or together with the sending of another image in a later step e2).

In a preferred variant the slave system can be configured to permanently store the images to be sent.

In a preferred variant of the method step b) can comprise sending of an invitation signal from the master system to the mobile devices, wherein preferably the invitation signal comprises program data for the configuration as slave system or connection information for receiving such program data.

In a preferred variant of the method the master system can be configured to send recording criterion and series ending criterion, preferably upon manual activation, to a slave system, which does not yet perform step e) and which is preferably newly configured, wherein this slave system afterwards performs step e) as well. This allows to add additional mobile devices as slave systems using the method. For these additional slave systems modified recording criteria and/or series ending criteria can also be set.

In a preferred variant of the method the master system can at the same time be configured as slave system and furthermore configured to not perform the step e) for itself or to interrupt the step e), especially upon manual activation.

In a preferred variant of the method the slave systems can be configured to inform the user about imminent substeps e1) or e2) via signals, wherein preferably the process before substep e2) is paused until either a predetermined time has elapsed or the user has finished entering data, especially input of a text. The entered data can be jointly send in substep e2), wherein the series of images preferably comprises the entered data.

In a preferred variant of the method a server can be provided usually reachable via electronic distance communication, especially the Internet, local networks, virtual networks or social networks, which server is configured to perform the functionality of the master system, to provide program data for the configuration as master system and/or slave system and/or to provide the series of images in an encoded way publicly or only for the mobile devices, which are or were configured as corresponding slave systems, wherein preferably step b) comprises the transfer of a cryptographic key to the master system and/or to the slave systems, with which access to the corresponding series of images on the web server is possible. Such a server can especially be a web server.

Also an access system via accounts can be configured so that every corresponding user has access to the series of images, which have been created with his account as account of the master system or of the slave system.

In a preferred variant of the method different recording criteria can be set for different slave systems.

In a preferred variant of the method additionally a second recording criterion and a second series ending criterion can be set, wherein step e) comprises furthermore the steps, preferably repeatedly:
  e3) recording at least one image with the camera of the slave system whenever the second recording criterion is fulfilled and the second series ending criterion is not fulfilled; and
  e4) sending the image from the slave system to the master system together with a time stamp of the image;
wherein preferably the second recording criterion is receiving a confirmation signal that all slave systems have executed step e2) and/or in case of repetition have executed step e4). This allows the recording of a series of images with several images respectively recorded at the same time.

In the preferred variant of the method furthermore an image criterion can be set in step c1) or c2) and can be send in step d1) or d2) to the slave systems, wherein the image criterion comprises parameters of the image recording like for example zoom, number of pixels, sharpness or the like, wherein the image recording in step e1) takes place according to the image criterion and/or wherein the image recording in step e1) takes place when the image criterion is fulfilled.

In the preferred variant of the method the slave systems can be divided in primary slave systems and sub slave systems or can be configured as such, wherein to every primary slave system at least one of the sub slave systems is assigned to, wherein in the primary slave system the recording criterion for the corresponding sub slave systems can be set or can be varied according to limits set in the master system.

In the preferred variant of the method the master system or the server is configured to transmit the series of images to social networks or to provide it inside the social networks. Furthermore, a social network can also be configured on the server or the server can be part of a group of servers, upon which a social network is configured.

A preferred variant of the method is also the usage of the method for an application according to one of the examples on page 2 of this description.

The invention also relates to several mobile devices and preferably one server, each configured or designed according to the previously described features of the method.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

In the following examples for the realization of the invention are described with reference to the Figures.

FIG. 1 shows schematically an example for an inventive method. In a first step 200 the devices are provided. This usually means that available mobile devices with cameras are selected for example several smartphones, with which a series of images is to be recorded.

Hereafter in the second step 210 the selection is made manually or through configuration (for example on the basis of local configuration data or remotely available or on the basis of data from accounts and/or user profiles), which of the mobile devices are to be configured as master system and which as slave system, and this configuration is carried out. This can take place by respective program data being downloaded from the network, for example the Internet, and being installed, for example in the like of one or several apps which are installed on smartphones. Or in step 210 it is set in programs/apps already present on the devices via selection which device is the master device and which ones are slaves.

Therein the master system can also be at the same time one of the slave systems, wherein the method basically intends to configure at least two slave systems.

Figure 1:
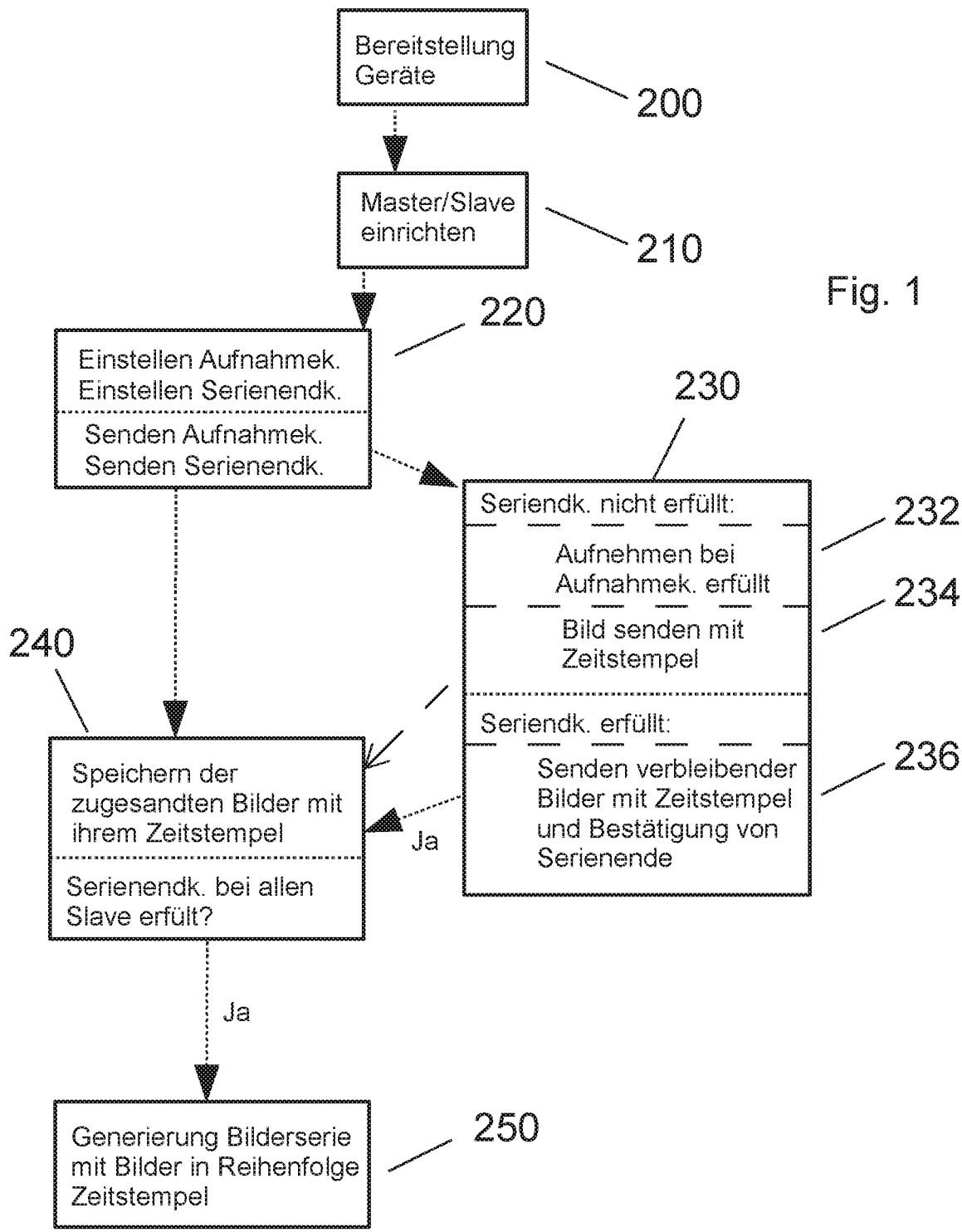
FIG. 1 shows a block diagram of an inventive method for networking independent synchronized generation of a series of images.

In the first part of the step 220, which is performed with the device configured as master (what lies in the left of FIG. 1 are steps which are carried out with the master system; correspondingly step 230 lying on the right is carried out with the slave systems), recording criterion and series ending criterion is set. Afterwards, these are sent to the slave systems in the second part of step 220.

In the following, step 230 is carried out as long as the series ending criterion is not fulfilled.

Therein in a sub step 232 of step 230 an image and/or a video and/or several images are always recorded with the camera of the respective slave system, when the recording criterion is fulfilled. Alternatively, also the user of the slave system can be instructed to record an image, when the criterion is fulfilled.

Afterwards, the image or the images are sent to the master system with a time stamp (this is of course not applicable for slave system which serve at the same time as master), wherein additional recordings take place as long as the series ending criterion is not fulfilled and the recording criterion is fulfilled.

In case the series ending criterion is fulfilled in the sub step 236 all remaining images are sent to the master system with the time stamp, which especially includes all images whose sending failed in sub step 234 due to lack of connection between slave and master. Therein additionally the information is sent that the series is finished on this slave system so that no further images are to be expected.

Sub step 236 especially can be repeated as long as images remain whose receiving has not being confirmed by the master system.

While step 230 is carried out with the slave systems, step 240 is also carried out with the master system as images are received and saved. Preferably in each case a confirmation of receiving will be send to the respective slave system. This preferably takes place until the series ending criterion is fulfilled and preferably until all slave systems have confirmed a respective end.

Additionally a further criterion for ending step 240 can also be provided and/or set; for example exceeding a time limit, exceeding a certain number of finished series by slave systems or also a manually activated function which ends step 240.

In step 250 then all generated images are composed to a series of images in order of their time stamps. Therein the images can also be connected with further information like for example texts generated by the users of the slave systems during step 230.

Figure 2:
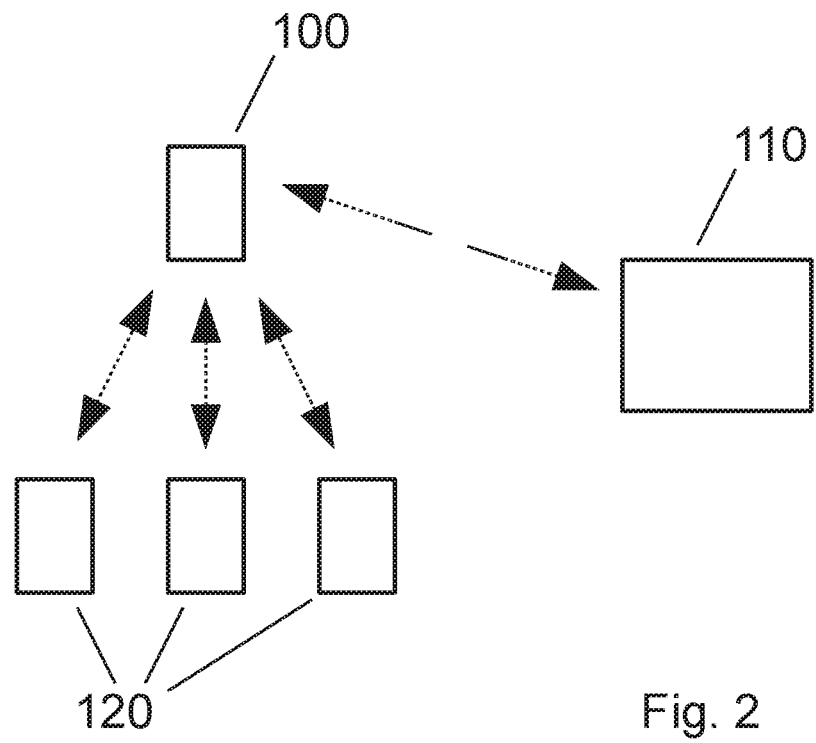
FIG. 2 shows schematically the networking of several mobile devices and of a web server.

In FIG. 2 devices used in a variation of the method described previously are shown schematically. Indeed four mobile devices are configured as the master system 100 and three slave systems 120. But additionally the Web server 110 exists.

The method differs from that shown in FIG. 1 therein that although images are sent to the master system 100 however the master system 100 forwards the images to the web server 110. Carrying out the steps 240 and 250 then takes place on the web server 110.

Additionally to generating the series of images the web server 110 can then provide access data and/or encoding data to the master system 100 and/or to the slave systems 120, so that from these systems the generated series of images can be obtained. Therein the usual encryption techniques like public-key encryption can be used.

The latter can alternatively also take place in or before step 200 by the web server 110 for example providing apps and at the same time also access data or accounts to the mobile devices.

Figure 3:
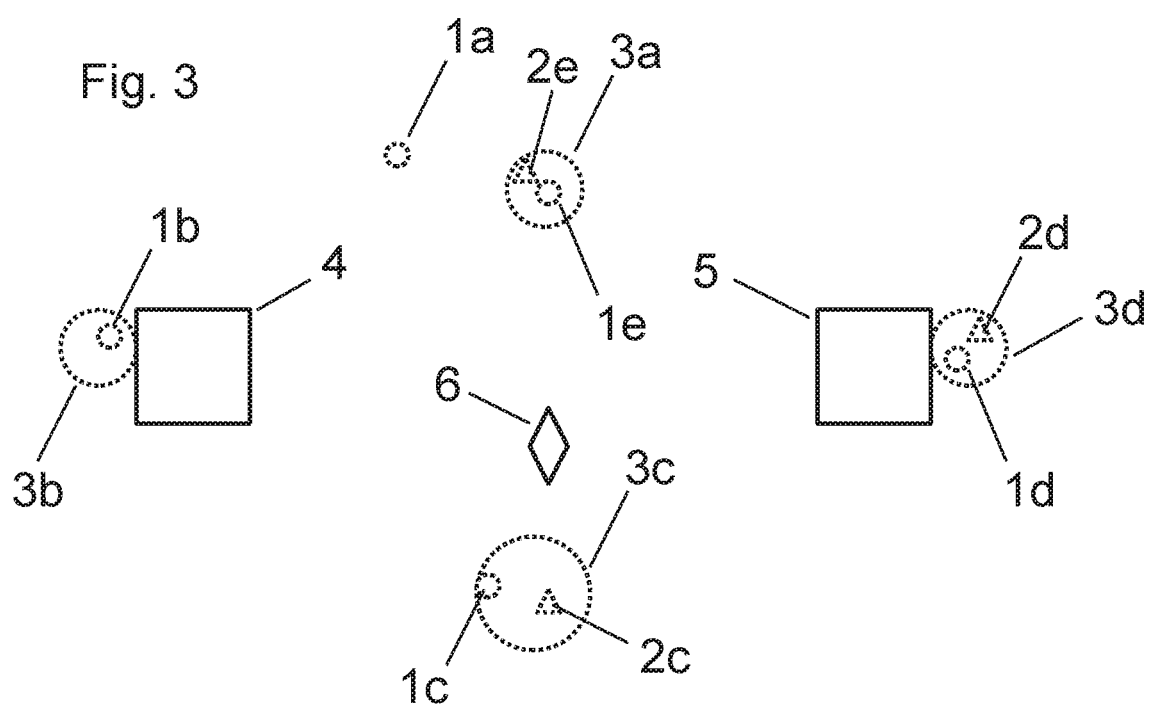
FIG. 3 shows schematically in a top view various situations with and without image recording according to the inventive method.

FIG. 3 shows schematically the application of an inventive method in a certain scenario in top view.

Therein the drawn through lines represent real existing objects, namely the two objects of interest 4 and 5 with a quadratic base, which might be for example buildings 4 and 5, and the object with a rhomboid base 6, which for example might be a piece of art 6.

Large dashed circles 3a, 3b, 3c and 3d represent recording areas defined within the method, which are relevant for recording criteria of the method.

Small dashed circles 1a to 1e represent several positions of a first mobile device or slave system or the user of the slave system at different points in time. Small dashed triangles 2c, 2d and 2e represent slave systems or users different from the first slave system and different from one another, which are part of the same method as the first slave system.

At the beginning of the method a mobile device is at position 1a and is configured as a slave system according to step 210. At a not shown master system recording criteria and the series ending criterion according to step 220 are defined.

As recording criteria are set:
present in area 3b and no other slave system in area 3b, wherein area 3b is defined as a circle which touches the wall of the building 4 at a certain place (first recording criteria);
present in area 3d and no other slave system in area 3d, wherein area 3d is defined as a circle which touches the wall of the building 5 at a certain place (second recording criteria);
present in area 3c, wherein area 3c is defined by the distance from the piece of art, and the camera positioned and oriented such, that in the image data captured by the camera the left and the right corner of the piece of art 6 are at the same distance from the lower corner (third recording criteria); and
present in area 3a, wherein the area 3a is defined by a circle with respective distance to the middle of the circle from the piece of art (fourth recording criteria).

The areas might for example have been defined via a respective screen input within a displayed satellite photo. But every other kind of input is also possible.

Therein as series ending criterion positioning in area 3a and recording of an image from this area according to the last recording criterion is set.

Furthermore it is set that the users each only receive the message that an image is to be recorded and that they receive a confirmation if an image according to one of the recording criteria was recorded.

Recording criteria and series ending criterion are transferred to the slave system 1a. With that a part of the method starts which corresponds to step 230.

The slave system is brought to the building 4, wherein the slave system 1b generates according to the previously described step 232 a message when entering the area 3b that an image is to be recorded, because the slave system is in the right area and no other slave system is present. This corresponds to the first recording criterion.

The user activates manually the slave system 1b accordingly so that an image is recorded. The slave system generates a confirmation, that an image according to the first recording criterion was recorded, and the image is sent with a time stamp to the master system according to step 234. The master system sends a confirmation to the slave system 1b and this creates a respective message for the user, so that the user knows that his image was accepted for the series of images.

Thereafter the slave system is moved to area 3c. The slave system 1c however does not create a request for recording according to step 232, as the part of the third recording criterion about the correct orientation of the camera is not fulfilled. The user does not realize this and he makes a recording nevertheless.

As no recording criterion was fulfilled the recorded image is also not sent to the master system.

On the other hand at the slave system 2c which is also in the area a message according to step 232 is generated to record an image, because slave system 2c is in area 3c and is also in regard to the camera orientation orientated correctly towards the piece of art 6. As presence or absence of other slave systems is irrelevant for the third recording criterion the presence of the slave system 1c has no influence.

In the following the slave system 1d is brought into the area 3d. Although the slave system 1d is correctly positioned nevertheless the part of the second recording criterion that no other slave system should be present in area 3d is not fulfilled. Accordingly step 232 with a message requesting to record an image does not take place.

Nevertheless the users records an image. As no recording criterion is fulfilled this image is also not sent to the master system.

Subsequently the slave system 1e is moved into the area 3a. As the fourth recording criterion is fulfilled a message according to step 232 with a request to record an image is created. As the presence of other slave systems is not relevant with the fourth recording criterion the slave system 2e has no influence upon this. Rather the slave system 2e would also generate a request for recording if slave system 2e also just arrived in the area 3a.

After the user has recorded an image manually this image is sent to the master system according to step 234. The master system sends a confirmation to the slave system 1e and the slave system 1e creates a respective message for the user.

As now the series ending criterion is fulfilled step 230 is ended with sending a confirmation of the series ending to the master system, as all images have been sent successfully to the master system. The user receives a respective message through the slave system.

The master system will afterwards—if from the other slave systems similar confirmations of the series ending arrive or if otherwise a termination of step 240 takes place—generate a series of images. This series of images includes the images recorded with the slave systems 1a, 1b, 1c, 1d, 1e from the positions of the slave system 1b and 1e according to their time stamps together with the other images of the other slave systems belonging to this series of images.

Of course the method can also be arranged to generate additional messages. For example it is generally possible within all inventive methods that users are alerted via messages about the partial fulfillment of the recording criteria (for example with the slave system 1d that the position is correct, but that another slave system is present) or the nearly complete fulfillment of the recording criterion. This can especially take place in form of instructions, for example how the orientation of the camera is to be changed, for example for the slave system 1c.

Furthermore, it can also be provided that the user can manually retrieve respective information.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

The invention claimed is:

1. A method for generating a collection of images comprising the steps of:
   a) providing at least two mobile devices with a data processing unit, a storage memory and a camera integrated therein or connected thereto;
   b) providing a master system with a data processing unit and a storage memory or configuring of one of the mobile devices as the master system and configuring of the other or of all mobile devices as slave systems;
   c1) setting a recording criterion in the master system;
   d1) transmitting the recording criterion to the slave systems and saving the recording criterion in each slave system;
   c2) setting a series ending criterion in the master system;
   d2) transmitting the series ending criterion from the master system to the slave systems and saving the series ending criterion in each slave system;
   e) respectively performing on each said slave system a process for recording an image on each slave system as long as the series ending criterion is not fulfilled comprising the steps:
      e1) recording at least one image with the camera of one of the respective slave system whenever the recording criterion is fulfilled for that respective slave system; and
      e2) sending the image from the respective slave system to the master system together with a time stamp, a series number and/or another variable for grouping the image;
   f) saving each of the images send respectively in step e2) with their time stamp, their series number and/or their variable for grouping in the storage memory of the master system; and
   g) generating a series of images comprising the images sent in order according to their time stamp, their series number and/or their variable for grouping.

2. The method according to claim 1, wherein the steps are carried out in alphabetical order, wherein step c1) occurs before step d1) and step c2) occurs before step d2), wherein preferably steps c1) and c2) and also d1) and d2) occur respectively at the same time.

3. The method according to claim 1, wherein more than one recording criterion is set and wherein in the process for recording an image a recording of an image with the camera of one of the slave systems takes place whenever one of the recording criteria is fulfilled.

4. The method according to claim 1, wherein the recording criterion is fulfillment of a single subcondition of the recording criterion or fulfillment one, several or all subconditions of the recording criterion.

5. The method according to claim 1, wherein the mobile devices comprise means for determining a position coordinate, wherein the recording criterion or a single subcondition thereof is entry or positioning of one of the mobile devices in a selected or a predefined area around a position coordinate.

6. The method according to claim 1, wherein the recording criterion or a single subcondition thereof is the lapse of a time span or a point in time.

7. The method according to claim 1, wherein the recording criterion or a single subcondition thereof is a relative position of the slave system to another slave system and/or to the master system.

8. The method according to claim 1, wherein sending and receiving only takes place between the master system and at least one slave system; and
   wherein no sending and receiving takes place between the slave systems.

9. The method according to claim 1, wherein the camera of one of the slave systems is continuously or in phases in a recording condition and collects optical data, wherein the slave system and/or the master system comprises an image recognition software for analyzing this optical data, wherein the recording criterion or a single subcondition thereof is the identification of a certain pattern or a certain structure by the image recognition software and/or is the comparison with other patterns, structure and/or images by the image recognition software.

10. The method according to claim 1, wherein the recording criterion or a single subcondition thereof is a command, input or trigger of the user at the master system and/or at one of the slave systems.

11. The method according to claim 1, wherein in case of a breakdown of communications between the master system and the slave system each mobile device starts and/or continues with step e) and performs step e1) based on the stored recording criterion.

12. The method according to claim 1, wherein the slave systems are configured to have a manual recording function, whose activation during the image recording process causes the recording of an image by the camera of the slave system and the sending of said image from the slave system to the master system together with a time stamp of the image.

13. The method according to claim 1, wherein the master system is configured to react with a receipt confirmation upon receiving an image in step e2).

14. The method according to claim 1, wherein the slave system is configured to save the image, especially permanently or in case of interruption of a connection of the slave system with the master system and/or in case of failure of a sending according to step e2), wherein it is send again in a later point in time in case of restoration of the contact and/or together with the sending of another image in a later step e2).

15. The method according to claim 1, wherein step b) comprises sending an invitation signal from the master system to the mobile devices, wherein preferably the invitation signal comprises program data for the configuration as slave system or connection information for receiving such program data.

16. The method according to claim 1, wherein the master system is configured to send recording criterion and series ending criterion, preferably upon manual activation, to a slave system, which does not yet perform step e) and which is preferably newly configured, wherein this slave system afterwards performs step e) as well.

17. The method according to claim 1, wherein the master system is at the same time configured as slave system and furthermore configured to not perform step e) for itself or to interrupt the step e), especially upon manual activation.

18. The method according to claim 1, wherein the slave systems are configured to inform the user about imminent substeps e1) or e2) via signals, wherein preferably before substep e2) it is waited until either a predetermined time has elapsed or the user has finished entering data, especially input of a text, wherein the entered data is jointly send in substep e2), wherein the series of images preferably comprises the entered data.

19. The method according to claim 1, wherein a server is provided reachable via especially electronic distance communication, especially the Internet, local networks, virtual networks or social networks, which server is configured to perform the functionality of the master system, to provide program data for the configuration as master system and/or slave system and/or to provide the series of images in an encoded way publicly or only for the mobile devices, which are or were configured as corresponding slave systems, wherein preferably step b) comprises the transfer of a cryptographic key to the master system and/or to the slave systems; and/or to provide a user profile linked to the series of images, so that a certain user can access the series of images.

20. The method according to claim 1, wherein different recording criteria are set for different slave systems.

21. A method according to claim 1, wherein additionally a second recording criterion and a second series ending criterion are set, wherein step e) comprises furthermore the steps, preferably repeatedly:
  e3) recording at least one image with the camera of the slave system whenever the second recording criterion is fulfilled and the second series ending criterion is not fulfilled; and
  e4) sending the image from the slave system to the master system together with a time stamp of the image;
  wherein preferably the second recording criterion is receiving a confirmation signal that all slave systems have executed step e2) and/or in case of repetition have executed step e4).

22. A method according to claim 1, wherein furthermore an image criterion is set in step c1) or c2) and is send in step d1) or d2) to the slave systems, wherein the image criterion comprises parameters of the image recording like for example zoom, number of pixels, sharpness or the like, wherein the image recording in step e1) takes place according to the image criterion and/or wherein the image recording in step e1) takes place when the image criterion is fulfilled.

23. The method according to claim 1, wherein the slave systems are divided in primary slave systems and sub slave systems or are configured as such, wherein to every primary slave system at least one of the sub slave systems is assigned to, wherein in the primary slave system the recording criterion for all of the corresponding sub slave systems can be set or can be varied according to limits set in the master system.

24. The method according to claim 1, wherein step e1) is always recording at least one image with the camera of the respective slave system whenever the recording criterion is fulfilled for that respective slave system and the series ending criterion is not fulfilled for that respective slave system.

25. The method according to claim 1, wherein step g) is only performed after each slave system has stopped performing step e).

26. The method according to claim 25, wherein step g) is only performed after all slave systems have confirmed a respective end of step e).

27. The method according to claim 1, wherein the recording criterion is fulfilled several times before the series ending criterion is fulfilled.

28. The method according to claim 1, wherein several recording criteria are set in step c1);
  wherein these several recording criteria are transmitted and saved in step d1); and
  wherein in step e1) recording at least one image with the camera of the respective slave system always takes place whenever at least one of the several recording criteria is fulfilled for that respective slave system.

29. The method according to claim 1, wherein both the recording criterion and the series ending criterion is one selected from the group consisting of position, time, elapsed time, distance to other devices or points, bodily characteristics of the user, receiving certain signals, certain reciprocal communication, certain activities/messages/signals in networks, confirmation or command signals of the master system, air pressure, temperature, humidity or speed of the slave system; and
  wherein the selection is different for the recording criterion and the series ending criterion.

30. A system for generating a collection of images comprising:
  a group of mobile devices,
  wherein at least one of said mobile devices is configured as a master system, and
  wherein at least one of said mobile devices is configured as a slave system,
  wherein said group of mobile devices carries out the steps of claim 1.

* * * * *